United States Patent [19]
Imai

[11] 3,895,857
[45] July 22, 1975

[54] BEHIND-STOP TESSAR TYPE PHOTOGRAPHIC LENS SYSTEM

[75] Inventor: Toshihiro Imai, Tokyo, Japan

[73] Assignee: Olympus Optical Co., Ltd., Tokyo, Japan

[22] Filed: June 24, 1974

[21] Appl. No.: 482,762

[30] Foreign Application Priority Data
June 26, 1973 Japan.............................. 48-72410

[52] U.S. Cl.................................. 350/227; 350/206
[51] Int. Cl. ............................................ G02b 9/20
[58] Field of Search..................................... 350/227

[56] References Cited
UNITED STATES PATENTS
3,615,126  10/1971  Kojima.............................. 350/227

Primary Examiner—John K. Corbin
Attorney, Agent, or Firm—Cushman, Darby & Cushman

[57] ABSTRACT

A behind-stop Tessar type photographic lens system having a sufficiently long back focal length for which cutting of marginal rays by the stop is prevented and aberrations are corrected favourably.

1 Claim, 4 Drawing Figures

SPHERICAL
ABERRATION

F/2.8

-0.01 0 0.01

ASTIGMATISM

30°

-0.01 0 0.01

DISTORTION

-2 0 2 %

BEHIND-STOP TESSAR TYPE PHOTOGRAPHIC LENS SYSTEM

BACKGROUND OF THE INVENTION a. Field of the Invention

The present invention relates to a behind-stop Tessar type photographic lens system.

b. Description of the Prior Art

For behind-stop Tessar type photographic lens systems, aggravation of aberrations for offaxial rays at the zonal portion, especially of astigmatism and coma, are generally caused. Besides, behind-stop Tessar type photographic lens systems have a disadvantage that rays of large field angles are cut by the stop. Therefore, for behind-stop Tessar type photographic lens systems, it is required to prevent such cutting of marginal rays by the stop and to attain the sufficient back focal length which is needed to suit the construction of the camera.

SUMMARY OF THE INVENTION

It is, therefore, a primary object of the present invention to provide a behind-stop Tessar type photographic lens system for which aberrations for offaxial ray are corrected favourably, said behind-stop Tessar type photographic lens system not causing cutting of rays by the stop over a large field angle and having an adequate back focal length.

DETAILED DESCRIPTION OF THE PREFERRED EMBODIMENTS

Figure 1:
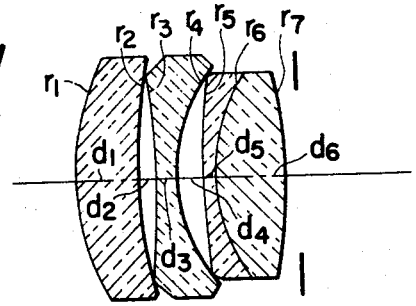
FIG. 1 shows a sectional view of the lens system according to the present invention.

The concrete contents of the lens system according to the present invention are described below. FIG. 1 shows a sectional view of the behind-stop Tessar type photographic lens system according to the present invention. As shown in said figure, the lens system according to the present invention comprises three lens components of four lenses in which the first lens component nearest the object is a positive meniscus lens with its convex surface positioned on the object side, a second lens component is a biconcave lens and a third lens component is a cemented biconvex doublet lens comprising a negative meniscus lens and a biconvex lens, the lens system according to the present invention further having numerical data as given below.

$f = 1, f_H = 0.800, 2\omega = 60°, 1:2.8$

| | | | |
|---|---|---|---|
| $r_1 = 0.348$ | | | |
| | $d_1 = 0.110$ | $n_1 = 1.78590$ | $\nu_1 = 44.24$ |
| $r_2 = 0.888$ | | | |
| | $d_2 = 0.033$ | | |
| $r_3 = -1.436$ | | | |
| | $d_3 = 0.040$ | $n_2 = 1.67270$ | $\nu_2 = 32.10$ |
| $r_4 = 0.304$ | | | |
| | $d_4 = 0.037$ | | |
| $r_5 = 1.617$ | | | |
| | $d_5 = 0.023$ | $n_3 = 1.60717$ | $\nu_3 = 40.34$ |
| $r_6 = 0.281$ | | | |
| | $d_6 = 0.117$ | $n_4 = 1.75700$ | $\nu_4 = 47.89$ |
| $r_7 = -0.691$ | | | |

In the above, reference symbols $r_1$ through $r_7$ respectively represent radii of curvature of respective surfaces of lenses, reference symbols $d_1$ through $d_6$ respectively represent thicknesses of respective lenses and airspaces between lenses, reference symbols $n_1$ through $n_4$ respectively represent refractive indexes for $d$-line of respective lenses, and reference symbols $\nu_1$ through $\nu_4$ respectively represent Abbe's numbers of respective lenses.

For the lens system according to the present invention having the above numerical data, cutting of marginal rays by the stop is prevented by making thicknesses of respective lenses and airspaces between respective lenses as small as possible for a lens system of F/2.8. Besides, by making the radius of curvature $r_3$ of the surface on the object side of the second lens component as $-1.6f < r_3 < -1.2f$, aberration toward the "plus" side for upper rays at the zonal portion is prevented from occurring, and favourable symmetry of coma is attained for offaxial rays at the zonal portion. Further, by making the radius of curvature $r_1$ of the front surface of the lens system as $0.3f < r_1 < 0.4f$, insufficient correction of upper rays at the zonal portion and insufficient correction of spherical aberration are prevented.

Moreover, to prevent increase of Petzval's sum, the refractive index $n_1$ of the first lens component and refractive index $n_4$ of the lens on the image side of the third lens component, both lenses being convex lenses, are made to have large values and, at the same time, are limited to a value within 1.8 in order to avoid using special materials. That is, for said lenses, refractive indexes are selected as values within ranges of $1.7 < n_1 < 1.8$ and $1.7 < n_4 < 1.8$.

Besides, in order to favourably correct chromatic aberration, materials of both lenses of the third lens component are selected from low-dispersion glasses of $\nu_3$, $\nu_4 > 30$.

Figure 2A:
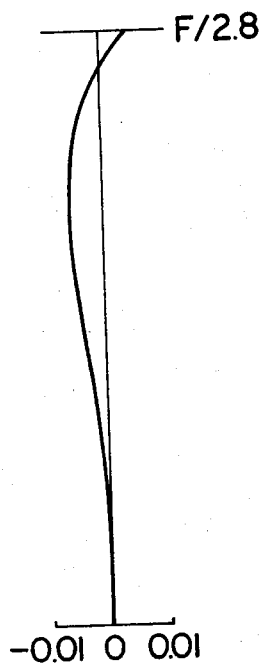
FIGS. 2A, 2B and 2C respectively show graphs illustrating aberration curves of the lens system according to the present invention.
Figure 2B:
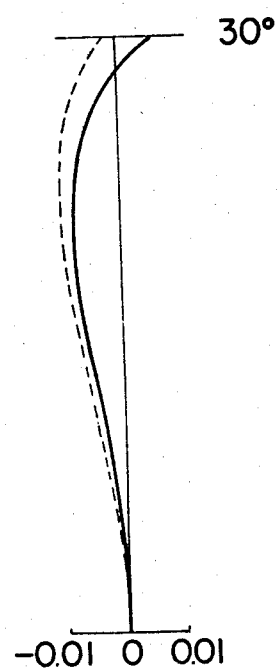
Figure 2C:
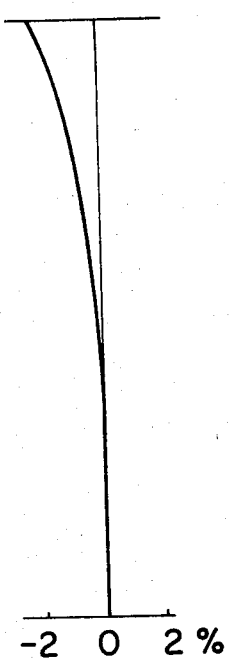

Aberration curves of the lens system according to the present invention are shown in FIGS. 2A, 2B and 2C. Out of them, FIG. 2A shows spherical aberration, FIG. 2B shows astigmatism and FIG. 2C shows distortion. Seidel's coefficients of aberrations in case of $f = 1.0$ are given in the table below. In said table, reference symbol SI represents the coefficient of spherical aberration, reference symbol SII represents the coefficient of coma, reference symbol SIII represents the coefficient of astigmatism, reference symbol P represents Petzval's sum and reference symbol SV represents the coefficient of distortion.

| | SI | SII | SIII | P | SV |
|---|---|---|---|---|---|
| 1 | 5.8731 | −0.1498 | 0.0038 | 1.2664 | −0.0324 |
| 2 | 0.1899 | −0.4747 | 1.1863 | −0.4960 | −1.7254 |
| 3 | −3.8093 | 3.2426 | −2.7602 | −0.2803 | 2.5882 |
| 4 | −8.2379 | −1.4759 | −0.2644 | −1.3229 | −0.2844 |
| 5 | 0.5066 | 0.4777 | 0.4505 | 0.2339 | 0.6453 |
| 6 | 3.2151 | 0.3531 | 0.0388 | 0.1887 | 0.0250 |
| 7 | 3.6394 | −2.2168 | 1.3503 | 0.6242 | −1.2027 |
| Σ | 1.3770 | −0.2437 | 0.0051 | 0.2140 | 0.0137 |

As described in the above and as it is evident from graphs of aberration curves and Seidel's coefficients of aberrations, the lens system according to the present invention is a behind-stop Tessar type lens system which does not cause cutting of marginal rays by the stop and for which aberrations are corrected quite favourably.

I claim:

1. A behind-stop Tessar type photographic lens system comprises three lens components of four lenses, a first lens component being a positive meniscus lens with its convex surface positioned on the object side, a second lens component being a biconcave lens and a third lens component being a cemented doublet lens comprising a negative meniscus lens and a biconvex lens, said behind-stop Tessar type photographic lens system having the following numerical data:

$f = 1$

| | | | |
|---|---|---|---|
| $r_1 = 0.348$ | | | |
| $r_2 = 0.888$ | $d_1 = 0.110$ | $n_1 = 1.78590$ | $\nu_1 = 44.24$ |
| | $d_2 = 0.033$ | | |
| $r_3 = -1.436$ | | | |
| $r_4 = 0.304$ | $d_3 = 0.040$ | $n_2 = 1.67270$ | $\nu_2 = 32.10$ |
| | $d_4 = 0.037$ | | |
| $r_5 = 1.617$ | | | |
| $r_6 = 0.281$ | $d_5 = 0.023$ | $n_3 = 1.60717$ | $\nu_3 = 40.34$ |
| | $d_6 = 0.117$ | $n_4 = 1.75700$ | $\nu_4 = 47.89$ |
| $r_7 = -0.691$ | | | |

In the above, reference symbols $r_1$ through $r_7$ respectively represent radii of curvature of respective surfaces of lenses, reference symbols $d_1$ through $d_6$ respectively represent thicknesses of respective lenses and airspaces between lenses, reference symbols $n_1$ through $n_4$ respectively represent refractive indexes for d-line of respective lenses, and reference symbols $\nu_1$ through $\nu_4$ respectively represent Abbe's numbers of respective lenses.

* * * * *